Figure 1:
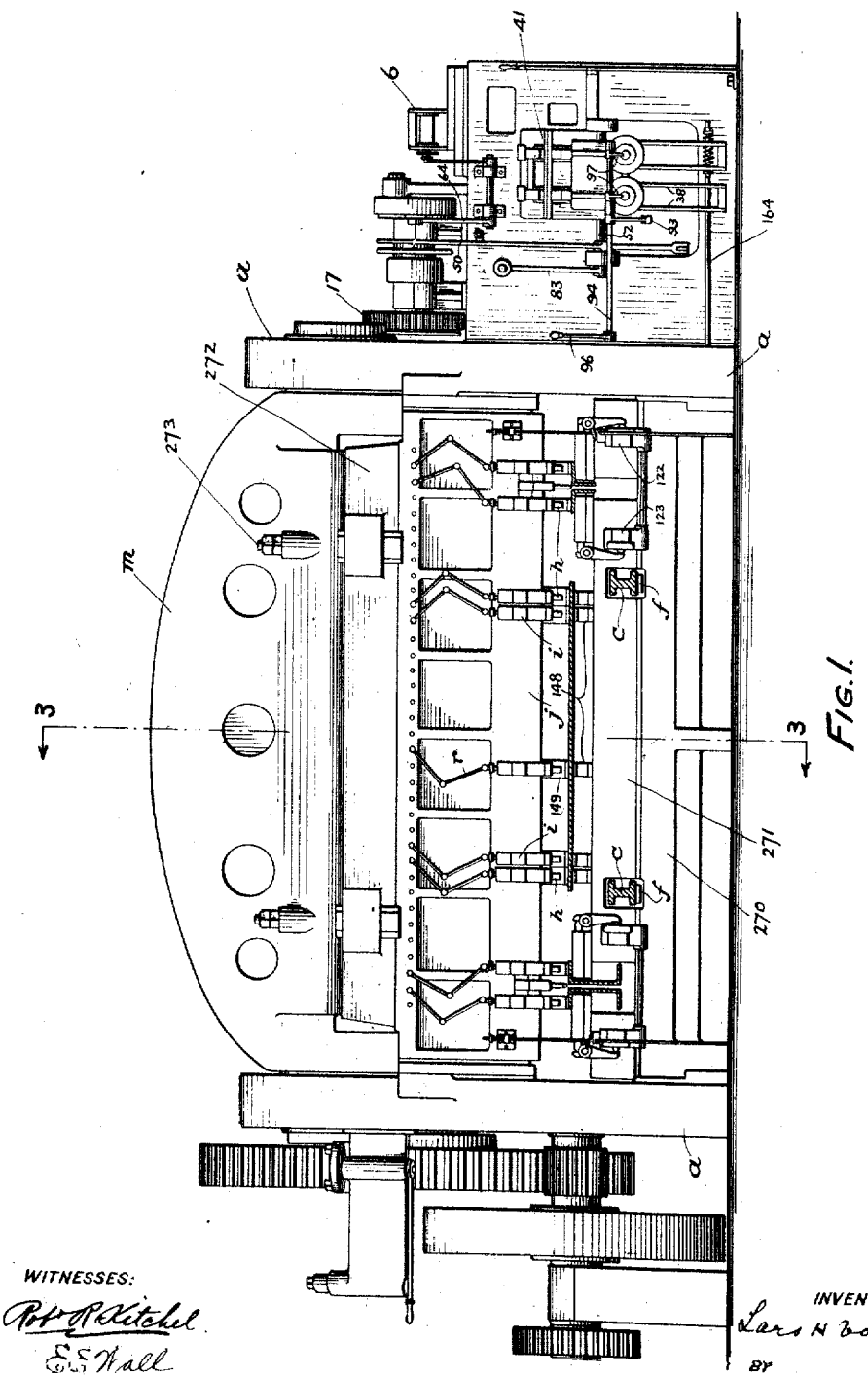

No. 833,811.  
PATENTED OCT. 23, 1906.  
L. H. VOLD.  
MULTIPLE PUNCH.  
APPLICATION FILED MAY 18, 1906.

8 SHEETS—SHEET 2.

WITNESSES:  
INVENTOR  
ATTORNEYS.

No. 833,811.

PATENTED OCT. 23, 1906.

L. H. VOLD.
MULTIPLE PUNCH.
APPLICATION FILED MAY 18, 1906.

8 SHEETS—SHEET 3.

WITNESSES:

INVENTOR

BY

ATTORNEYS.

No. 833,811.                                              PATENTED OCT. 23, 1906.
L. H. VOLD.
MULTIPLE PUNCH.
APPLICATION FILED MAY 18, 1906.

8 SHEETS—SHEET 4.

WITNESSES:

INVENTOR
Lars H. Vold
BY
Harding & Harding
ATTORNEYS

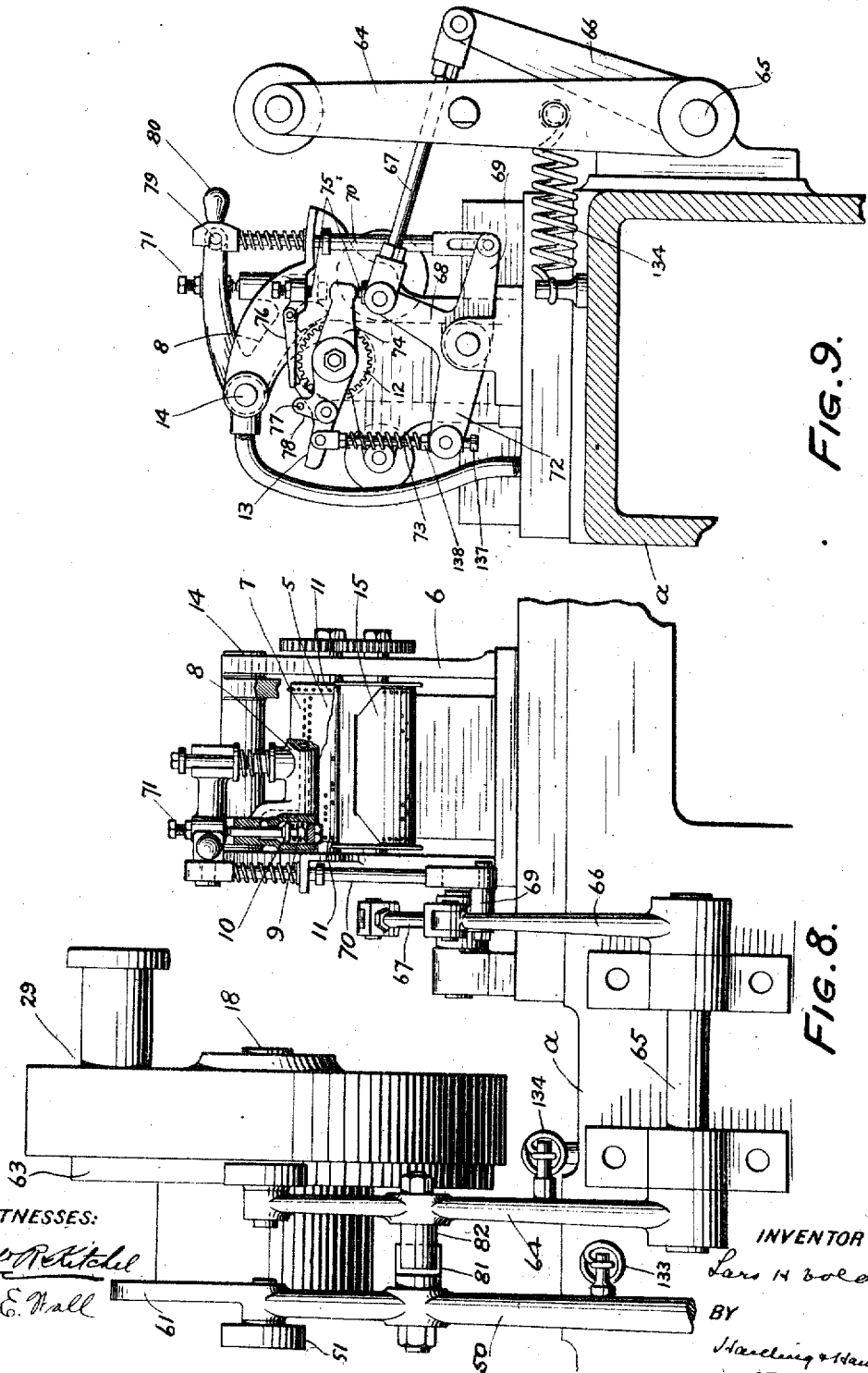

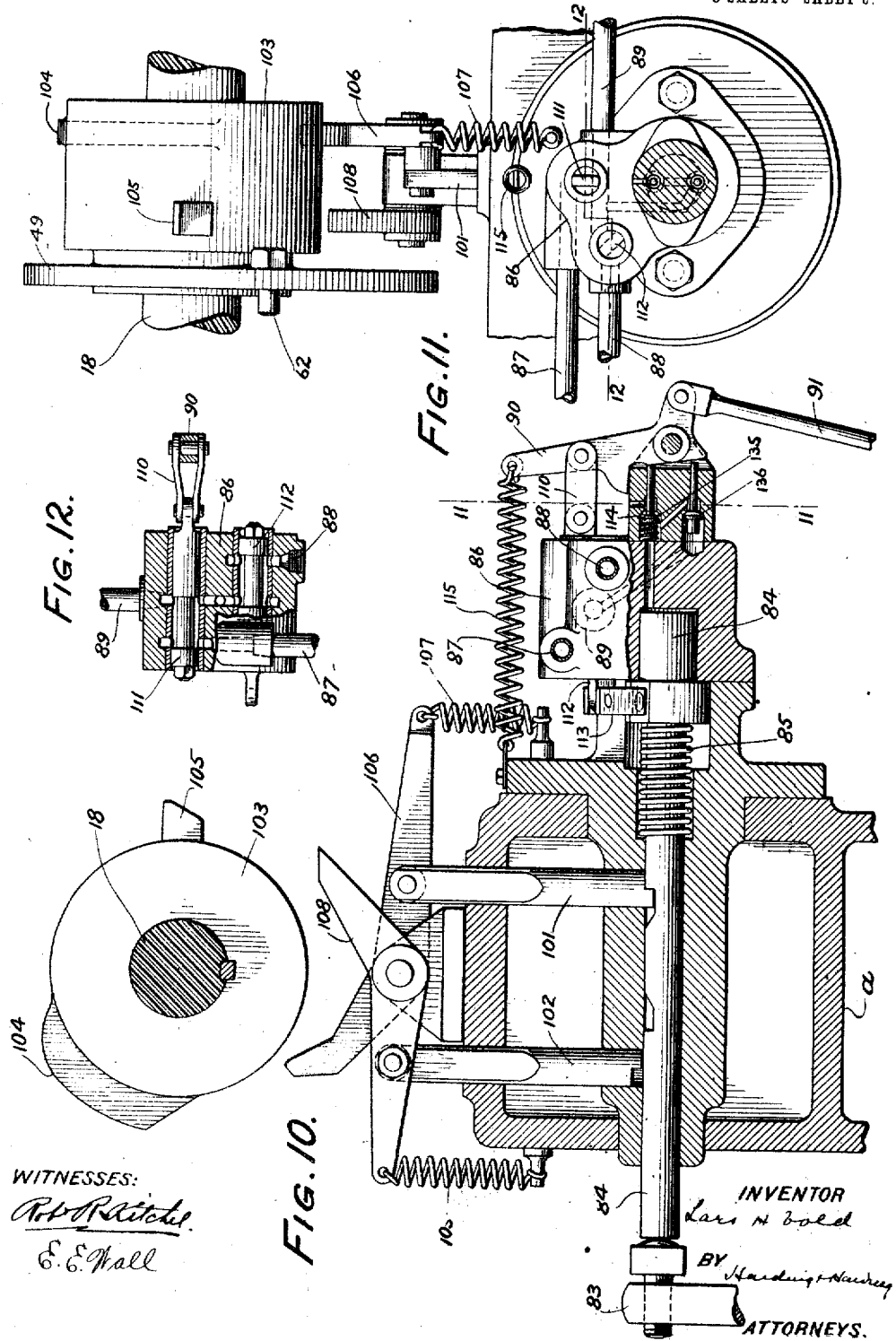

No. 833,811. PATENTED OCT. 23, 1906.
L. H. VOLD.
MULTIPLE PUNCH.
APPLICATION FILED MAY 18, 1906.
8 SHEETS—SHEET 7.

WITNESSES:
Rob R Mitchel
E. E. Wall

INVENTOR
Lars H Vold
BY
Harding & Harding
ATTORNEYS.

No. 833,811. PATENTED OCT. 23, 1906.
L. H. VOLD.
MULTIPLE PUNCH.
APPLICATION FILED MAY 18, 1906.
8 SHEETS—SHEET 8.
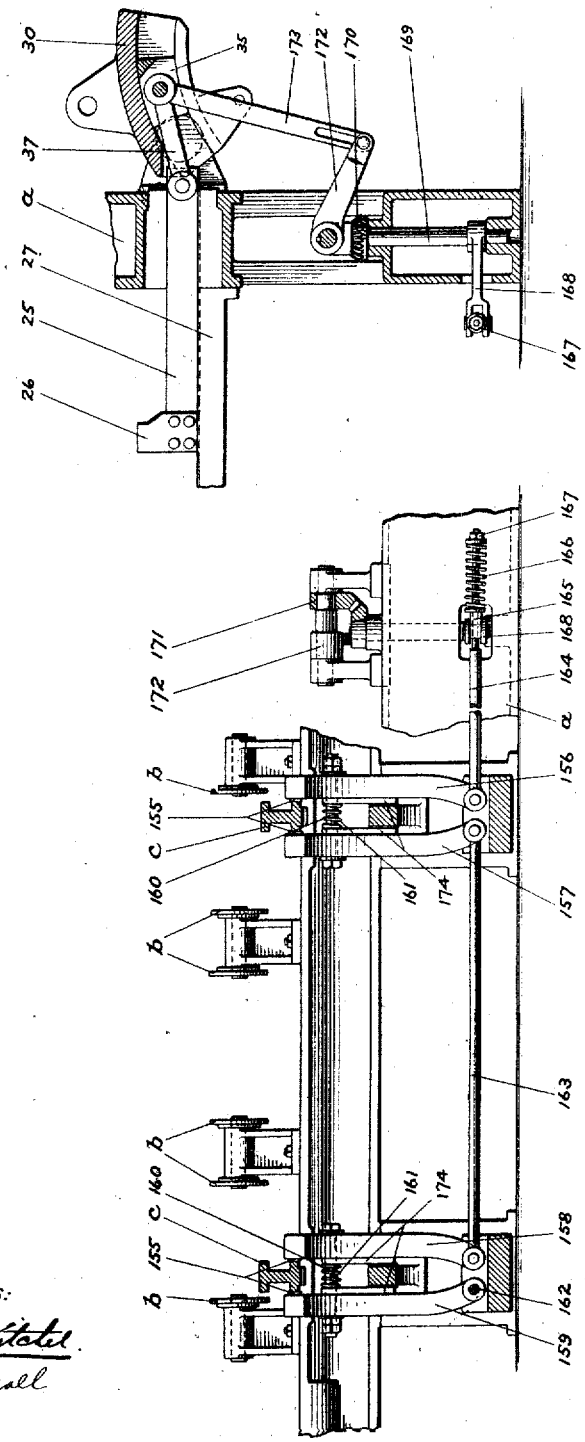

UNITED STATES PATENT OFFICE.

LARS H. VOLD, OF WESTVILLE, NEW JERSEY, ASSIGNOR TO WILLIAM SELLERS & COMPANY, INCORPORATED, OF PHILADELPHIA, PENNSYLVANIA, A CORPORATION OF PENNSYLVANIA.

MULTIPLE PUNCH.

No. 833,811.  Specification of Letters Patent.  Patented Oct. 23, 1906.

Application filed May 18, 1906. Serial No. 317,431.

*To all whom it may concern:*

Be it known that I, LARS H. VOLD, a citizen of the United States, residing at Westville, county of Gloucester, and State of New Jersey, have invented a new and useful Improvement in Multiple Punches, of which the following is a full, clear, and exact description, reference being had to the accompanying drawings, which form a part of this specification.

My invention relates to a new and improved automatic multiple spacing-punch.

The object of my invention is to produce a machine which will move and automatically move the stock or work to certain desired intervals of space and also to control and automatically to control a punch or series of punches, so that the desired punch or punches may be rendered operative.

It is further my object to embody in the machine such mechanisms as will cause an automatic stop of spacing and punching whenever the spacing should become undetermined by failure of the spacing-levers to close.

It is further my object to embody in the machine such mechanisms as will automatically limit the stopping and starting of the spacing and starting of punching to certain desired points during the cycle of operation of the machine.

It is further my object to embody in the machine such mechanism as will place the stopping of punching directly under control of the operator.

It is further my object to combine the operation of stopping and starting of punching and spacing in one operative lever to be operated at any point in the cycle.

It is further my object to control the automatic spacing and punching by a perforated paper sheet to be placed in the machine and automatically fed through the machine.

Speaking in general, I feed the work or stock which is to be punched over the dies beneath the reciprocating punch-bar carrying a number of punches, the desired punch or punches being automatically caused to act in the descent of the punch-bar.

I will now describe the embodiment of my invention illustrated in the accompanying drawings, in which—

Figure 2:
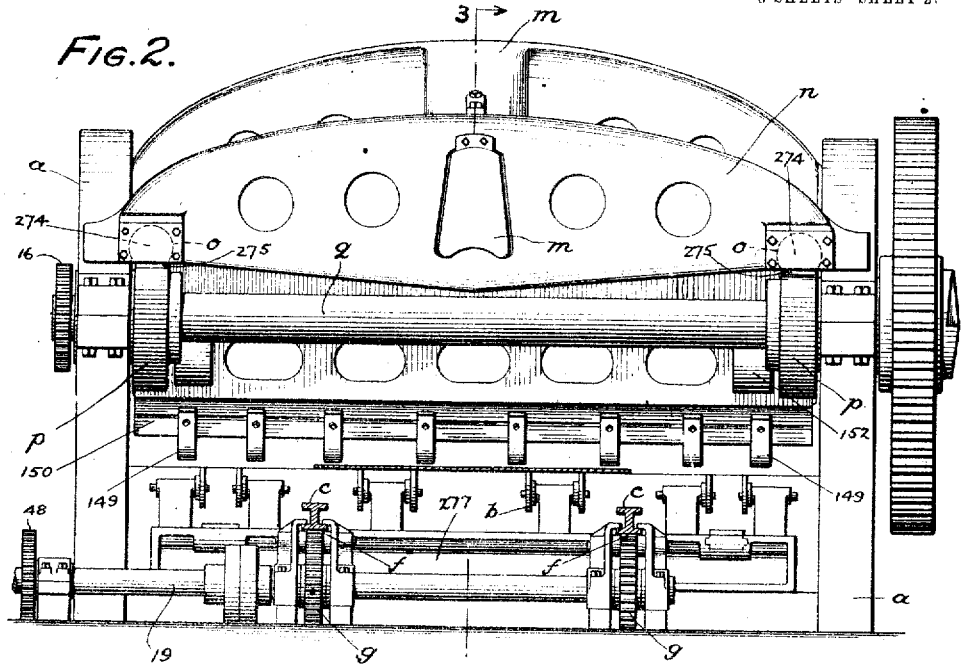
Figure 3:
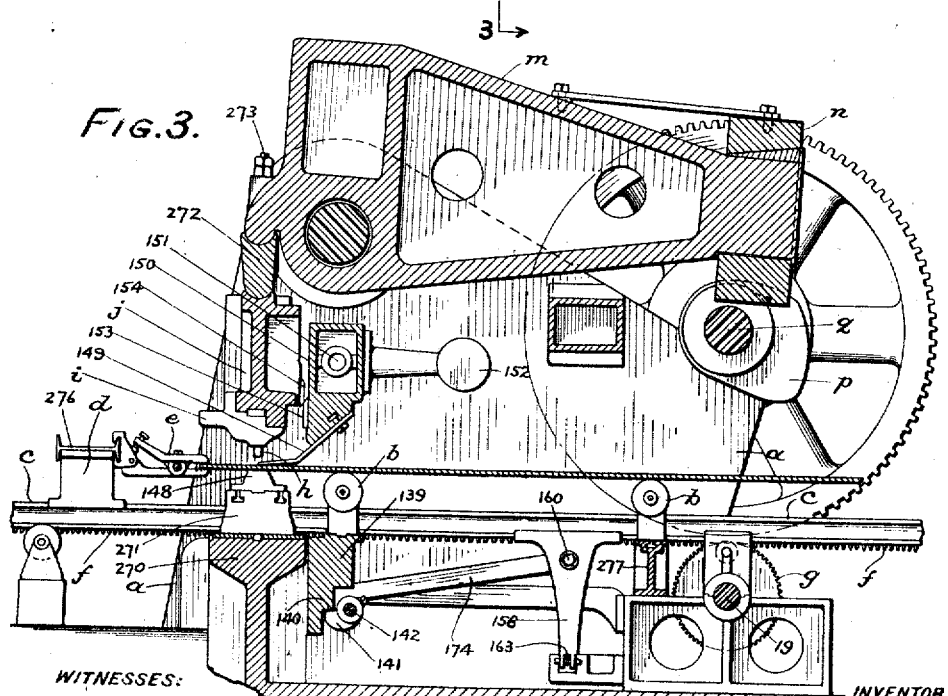
Figures 4, 5:
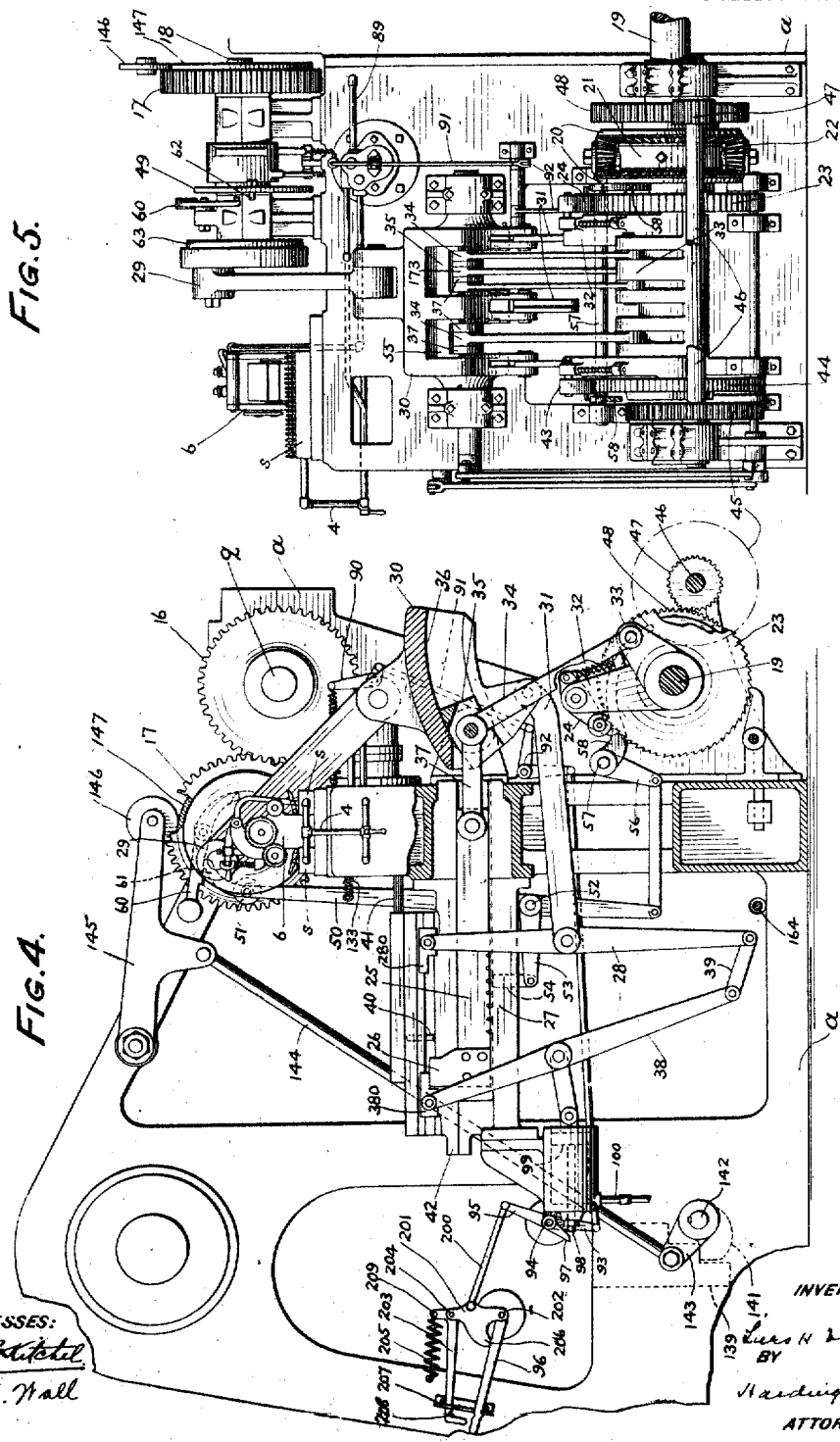
Figure 6:
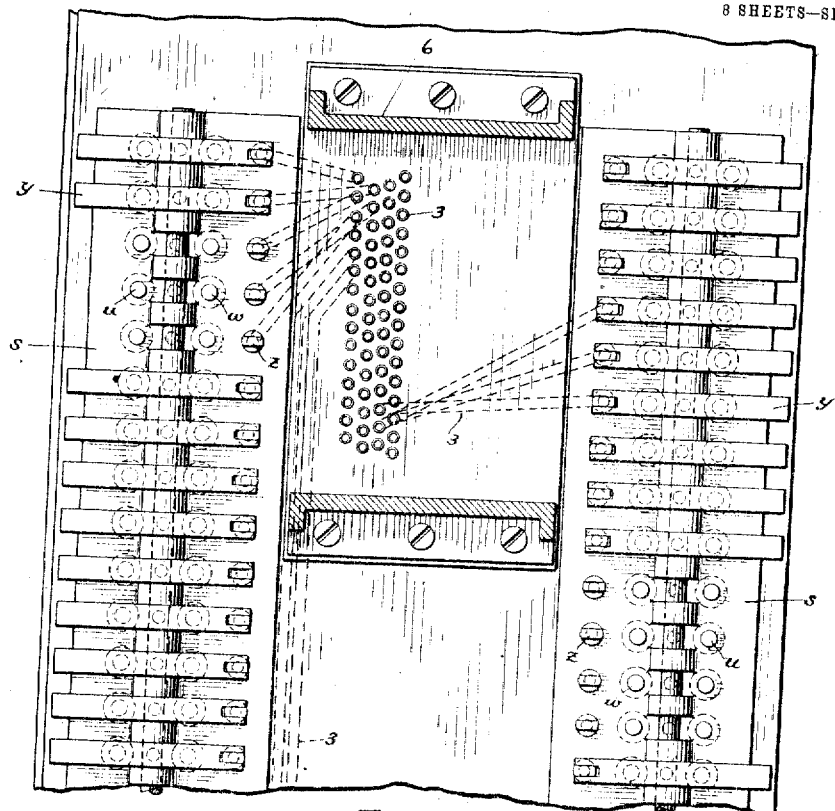
Figure 7:
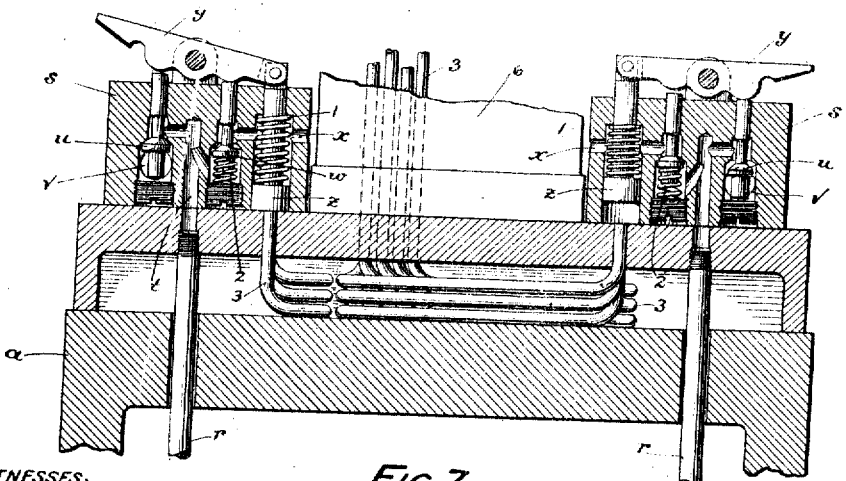
Figure 14:
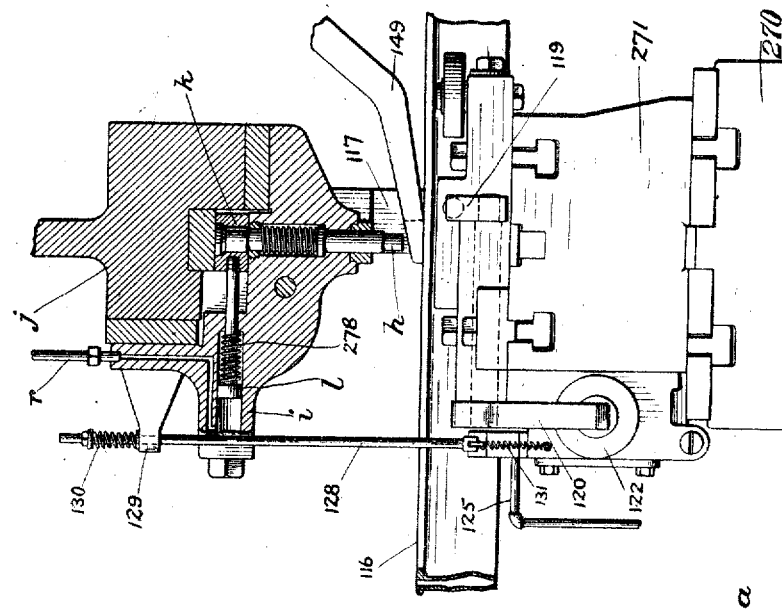
Figure 13:
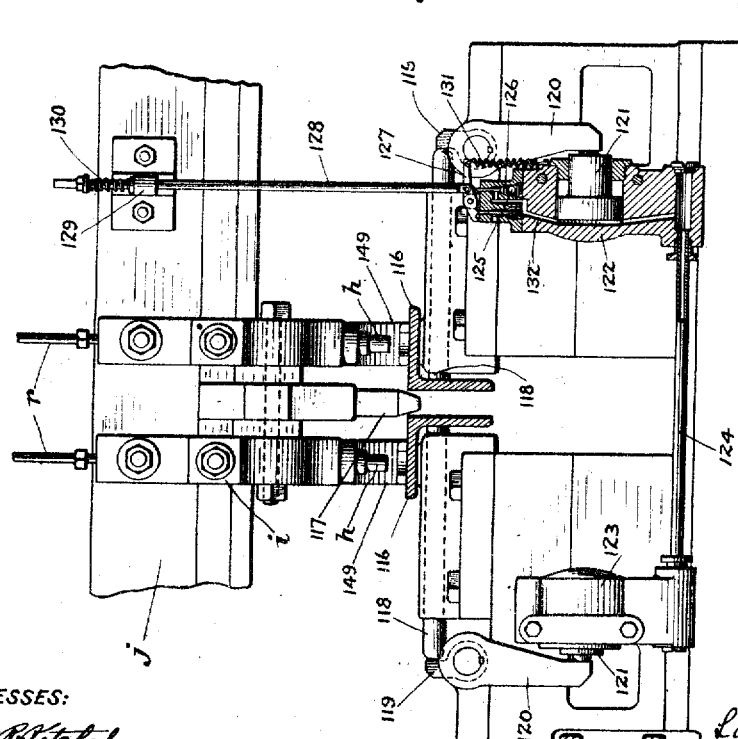

Figure 1 is a front elevation of the machine. Fig. 2 is a rear view. Fig. 3 is a horizontal cross-section on lines 3 3, Fig. 1 and Fig. 2. Fig. 4 is an elevation of the operating mechanism in partial section. Fig. 5 is a rear view of operating mechanism. Fig. 6 is a partial plan of pilot-valve arrangement. Fig. 7 is a cross-section through pilot and operating valves. Fig. 8 is a front elevation of paper-tower. Fig. 9 is a side elevation of paper-tower. Fig. 10 is a section showing emergency-stop. Fig. 11 is an end view of same. Fig. 12 is a detail section of emergency stop-valve. Fig. 13 is an elevation, partially in section, of holding device for angles and channels. Fig. 14 is a side view of same, showing gag-block in section. Fig. 15 is a cross-section through stock-carrier, showing elevation of brake mechanism. Fig. 16 is a section view showing brake connections.

$a\ a$ are the side housings bolted rigidly to the bottom beam 270, carrying the thrust-block 271, to which the adjustable die-blocks 148 are clamped.

$j$ is the reciprocating punch-bar carrying a number of punch-holders $i$, adjustable along the punch-bar $j$.

272 is a rocker connecting the reciprocating bar $j$ to the lever $m$.

273 represents bolts or links which connect the punch-frame $j$ to the lever $m$. Thus the rocker 272 serves to press the punch-bar down and cause the punch to act and by the bolts or links to return the punch-bar and withdraw the punches from the stock.

$n$ is an equalizing-bar, which is centrally pivoted on the end of lever $m$. The outer ends of the equalizing-bar $n$ have cylindrical sockets $o$, in which are loosely fitted cylindrical blocks 274, grooved to receive shoes 275 as bearings, which rest on the cams $p\ p$, which cams are on the main driving-shaft $q$. In each rotation of the main driving-shaft the cams $p\ p$ operate to lift the equalizing-beam $n$ and lever $m$, and thus, through rocker 272, to force down the punch-bar $j$, while the weight of the equalizing-bar $n$ returns the punch-bar $j$, through the bolts or links 273, to its upper position. By means of this arrangement I can use two cams, and although they may not be exactly alike the equalizing-bar will cause them to operate evenly on the lever $m$, the loose cylindrical block $o$ with its shoe providing a level surface for the cams $p$ $p$ to contact with.

Centrally through the machine transversely to the lines of punches and dies supported on a series of rollers pass a pair of stock-carriers $c$ $c$, on which are cut rack-teeth $f$. To the front end of these stock-carriers are bolted a pair of uprights $d$, between which is bolted an I-beam 276, carrying the grippers $e$, which grip and support the front end of the work or stock and draw it through the machine by the action of the stock-carriers. The other end of the work or stock is carried by a similar beam (not shown) adjustable along the stock-carrier.

$b$ $b$ are a number of rollers arranged in groups on the cross-beam 277 at certain intervals along the whole travel of the stock and serve to support the same. These rollers are adjustable along the beams upon which they rest.

The punch-holders $i$, Figs. 13 and 14, with gag-block cylinders, are mounted on the punch-bar $j$, each gag-block $k$ being operated by a piston $l$ in its cylinder. (See Fig. 14.) The punches are loosely mounted, so that when the gag-blocks are held by the spring 278 out of alinement with the punches the punches meet no resistance and they simply raise in their sockets. When any gag-block $k$ corresponding to its punch is moved into alinement with the punch, as in Fig. 14, and the punch meets a resistance, it acts as a rigid or fixed punch.

In my improved machine I operate the gag-block corresponding to each punch automatically and pneumatically. The cylinder $i$, Fig. 14, of each gag-block $k$ is connected by a tube $r$, which, as will hereinafter be described, is always connected either with a source of compressed air or directly with the atmosphere. Whichever of these tubes contains compressed air its corresponding gag-block is forced in and its punch is brought into operative condition, while the cylinders of the other punches being connected with the exhaust their punches are not in operative condition.

The air from the tubes to the gag-block cylinders is admitted, exhausted, and controlled in the following manner: The tubes from all the gag-block cylinders extend to either one or the other of a pair of air-boxes, Figs. 6 and 7. Each pipe from the gag-block cylinders enters a passage $t$ in this box. (See Fig. 7.) Corresponding to each of these passages is a valve $u$, which in one position connects the box-passage of the pipe with the air-supply, which air is admitted by pipe 4, Fig. 5, from a source of pressure-supply to the longitudinal passage $v$ in each box.

This valve $u$ is normally held closed by air-pressure. A second valve $w$ when open connects the passage $t$ to the exhaust through a supplemental passage $x$. Each of these valves has a stem in line of movement of a pilot-valve $z$. A spring 1 normally acts on this pilot-valve, holding it so that the lever $y$ holds the exhaust-valve $w$ opened against the action of the spring 2. When the pilot-valve is operated against the action of its spring, there is sufficient play between the lever $y$ and the stem of the air-valve $u$ to cause the exhaust-valve to be closed by the action of its spring before said lever positively acts to open the air-valve $u$. The pilot-valves are each operated by air led to the pilot-valve cylinder in each by means of pipes 3, each connecting with an orifice in a stationary cylinder 5 in the paper-tower 6. (See Fig. 8.) This cylinder has orifices 7 corresponding to the pipes 3 from the pilot-valve cylinder and to one of which orifices each pipe extends. The paper-tower in which this cylinder is placed is provided with a cover 8, which cover comprises an air receptacle or box which is connected with a source of air-pressure supply by a passage 9, controlled by a valve 10. Through the box of this cover are orifices corresponding in number and position to and which when the cover is closed over the cylinder 5 match the orifices 7 in the cylinder. Therefore when this cover 8 is moved down over the orificed cylinder 5 air will pass through all the orifices and lift all the pilot-valves, and thus force in the gag-blocks of all the punches, rendering all the punches operative. To control the desired punch or punches to be used, a paper sheet 15 is used which is fed by sprocket-rollers 11 over the face of this cylinder. On the shaft of these rollers is a ratchet-wheel 12, operated by a pawl 13. At each movement of the paper the portion coming in contact with the orificed portion of the cylinder is provided with perforations to correspond with the holes in the metal cylinder corresponding to the punches desired to be used. Therefore when the pilot-valves corresponding to the punches desired to be used are thus operated air will be admitted only to operate the gag-blocks of the desired punches at each movement of the punch-bar, the remaining gag-block cylinders being connected with the exhaust. This cover or clamp 8 on the paper-tower is pivoted at 14, so as to swing up away from the stationary cylinder in order to exhaust the pilot-valves to which pressure has previously been admitted, and thus return all the punches to normal condition and to allow the paper to be moved over the cylinder for a new action. This is done during the period in which the punch-bar is up and idle. At this time also provision is made to cut off the supply of air to the paper-tower cover 8 and to move the paper forward across the cylinder to bring a new series of orifices in the paper over the orificed portion of the stationary cylinder.

The operations of moving the stock-carrier a predetermined distance, of regulating the movements of the paper-tower, and sundry other movements of the machine are accomplished in the following manner: The movement of the stock-carrier is obtained in the following manner: A gear-wheel 16 on the main shaft $q$ meshes with a gear-wheel 17, Fig. 4, upon what may be termed the "cam-shaft" 18. Gears $g$ mesh with the racks $f$ on the stock-carrier $c$. Upon the shaft 19 of these gears are two bevel-wheels 20, which are loose upon this shaft, and upon arm 21, keyed to this shaft, are mounted two bevel-pinions 22, which bevel-pinions mesh with both the bevel-wheels 20. To one of these bevel-wheels is rigidly attached a ratchet-wheel 23, with which a pawl 24 is adapted to work. 25 is a sliding bar which carries a plate 26, which bar is supported and is movable in a guide 27 on a projection 42 from the frame of the machine. 28 is a floating lever, having the jaw 280, which has a movement along the face of this slide-bar and which is positively driven by means of a crank 29 on the cam-shaft, which crank is connected to the rocker 30, which in turn is connected to this floating lever 28 by a link 31. The pawl 24 is pivoted on one arm 32 of a bell-crank lever turning on shaft 19, carrying the stock-carrier rack-gears. The other arm 33 of this bell-crank lever is connected by a link 34 with a block 35, slidably mounted in a curved guideway 36 of the radius of link 34 in the rocker 30. This block is connected by a link 37 with the sliding bar 25. The position of the block 35 in the guide 36 determines the throw of the pawl, and the position of the block is determined by the position of the slide-bar. There is also a second floating lever 38, having a jaw 380, which lever is connected at its lower end by a link 39 to the lower end of the first-mentioned floating lever 28. 26 is a plate carried by the slide-bar. As shown, the jaw 380 of the floating lever 38 rests against the end of this plate 26 under these conditions, and under normal conditions the first-mentioned lever 28 reciprocates without causing any movement of the second-mentioned lever 38. When, however, one of a series of pins 40, which are operated by means of pneumatic tubes 41 in connection with orifices in the fixed paper-tower cylinder 5, is moved into operation in the path of movement of the jaw of the first-mentioned lever 28 and when that jaw in its movement strikes this pin, it causes the second floating lever 38 to move toward the first-mentioned lever, carrying with it the plate 26, and hence the slide-bar 25 and pawl-block. If, however, the plate 26 is in such position that the jaw of lever 28 strikes it before the end of its stroke, both levers 28 and 38 will move until the pin is reached, lever 28 moving the plate 26 in the opposite direction from that described. These movements continue until both levers strike the pin 40. This determines the throw of the pawl 24, and hence the extent of travel of the stock-carrier $c$. These pins 40 are spaced apart corresponding to a desired movement of the stock-carrier—say one inch. On the opposite side of the extension 42 from the machine is a corresponding arrangement, the slide-bar of which operates a block 55, which in turn controls the throw of a pawl 43, operating a second ratchet-wheel 44, loose on shaft 19, upon which are the bevel-wheels before mentioned. This loose ratchet-wheel has connected with it a pinion which meshes with a gear-wheel 45 on a supplemental shaft 46, which shaft in turn has a pinion 47, meshing directly with a gear-wheel 48 on the bevel-gear 20, gearing with 22 on 21 upon shaft 19, which carries the gears meshing with the stock-carrier rack. The arrangement is such that the pins 40 on the first-mentioned side of projection 42 are a distance adapted through the gearing to produce a movement of the stock-carrier in inches, while on the second-mentioned side the pins are a distance apart adapted through the gearing to produce a movement of the stock-carrier in fractions of an inch. There is thus obtained upon the shaft 19, the gears $g$, and the stock-carriers $c$ a movement equal to the sum of these two movements. The slide-bars are held in position during this operation of the pawls and released in the following manner: Upon the cam-shaft 18 is the peripheral cam 49, having high and low portions. A lever 50 has at one end a roller 51, contacting with this cam, the other end of this lever operating a rock-shaft 52, to which are connected two arms 53, each arm carrying a stop 54. When the low part of the cam is reached, the cam-lever 50 operates to throw the stops 54 into one of a series of notches in each slide-bar 25, spaced apart a distance equal to the distance of the respective pins 40. The stops 54 are retracted when the high portion of the cam is presented to the roller. The high and low portions of the cam are arranged so that the locking of the bars takes place when the pawls are in connection with the ratchet and released when the pawls have finished their stroke.

In order to prevent the pawls floating idly upon the teeth of the ratchet-wheel when not acting and, as will hereinafter be described, to hold the pawl inactive, there is provided the following arrangement: The lever 50 has a lower extension, which is connected by a link to an arm 56 on a rock-shaft 57. On this rock-shaft are mounted the wipers 58, one underlying one of these pawls 24, and the other wiper underlying the other pawl 43. When the cam-roll 51 is on the high portion of cam 49, it lifts the wipers, throwing the pawls out of action. When it is on the low portion of the peripheral cam, the wipers fall below the pawls and they drop down into connection with their ratchet-wheels.

In order to cause a quick movement of the pawls into action, the following mechanism is used: 60 is a lever, one end of which is in line with an upper extension 61 of the cam-lever 50, and the other end is in line of movement of a pin 62 upon the side face of cam 49. This lever 60 is intended to hold the lever 50 free from the face of the cam when the high portion of the cam is presented to the lever against the action of spring 133. The pin 62 on the face of the cam is in such position that it trips its lever just after the low point has been presented to the roller of the cam-lever 50, so that the spring 133 causes the cam-roll 51 to drop rapidly and suddenly on the low portion of the cam.

The paper-tower cover 8 and its appurtenances are operated in the following manner, (see Figs. 8 and 9:) Upon the cam-shaft 18 is the paper-tower cam 63, operating the lever or arm 64, which is connected to a rock-shaft 65 and held against its cam by a spring 134. At the opposite end of the rock-shaft is an arm 66, which is connected by a link 67 to a bell-crank lever 68, having the arms 69 and 72. The arm 69, by a slot-and-pin connection, is connected to the rod 70, carrying the paper-tower cover 8 and the pin 71, which operates the valves, admitting air to the paper-tower-cover box. The other arm 72 of this bell-crank lever plays between the nut 137 and collar 138 on the link 73, which link is connected with the pawl 13, which operates the paper-ratchet 12. An arm 74 is centrally pivoted with respect to the paper-ratchet. To one end of this arm is pivotally attached the pawl 13. The other end of this arm swings freely between adjustable stops 75. Secured to the machine, in line with the pawl which operates the ratchet, is the pivoted dog or catch 76. When the paper-tower cam 63 allows its arm 64 to be moved inward by spring 134, the spring upon the rod 70 raises the cover free from the cylinder, closing the valve 10. Arm 72 of the bell-crank lever has enough free motion on the link 73 to allow valve 10 to be closed, and the paper-tower cover 8 is lifted free of the paper strip before it contacts with the nut 137 on the end of link 73, and then positively forces the link down. This swings the pawl on its pivot to free it from the ratchet until it strikes stop 77, carried by a projection 78 upon the arm 74, after which the pawl moves free from and backward over the ratchet the distance of a tooth on the center of the paper ratchet-wheel as a fulcrum. In the reverse movement of the arm 64, under the action of the paper-tower cam, the first movement will be to allow link 73 to rise by means of its spring, thus putting the pawl again into engagement with the ratchet, and then the pawl will rack the ratchet the distance of one tooth, the throw being limited by the lever 74 contacting with the stop 75. Then the paper-tower cover will descend, contacting with paper strip and opening the valve 10 and again admitting air to the paper-tower box. In order to allow the paper-stop 15 to be adjusted at any time, the pawl 13 may be pressed down by hand against the action of the spring on link 73, freeing it from the paper-ratchet, and it will be held in this position by the catch 76. By raising the catch 76 the pawl at once again engages the ratchet-wheel. Rod 70 may be moved outward, disconnecting it from pin 79, and thus allow the paper-tower cover 8 to be thrown up entirely free from the orificed cylinder by the handle 80 for the purpose of inserting the paper strip.

In my machine cam-lever 50, which controls the wipers, carries a pin 81, Fig. 8, in alinement with a pin 82 on cam-lever 64, which controls the paper-tower, which pins do not contact with each other in the normal working of the machine. Cam-lever 50 is connected to a third lever 83, (shown in Fig. 1,) which is in the path of a ram 84 (see Fig. 10) and under certain conditions is operated by that ram so as to move the wiper-lever 50 off of its cam far enough to also hold paper-tower lever 64 off its cam by means of the pin 81 contacting with pin 82. This is done under certain circumstances to lock the paper-tower and to stop the movement of the carrier. In my machine this ram is operated in the following manner: This ram is normally held in its inner position by pressure, as shown a spring 85, although I do not intend to limit myself to this means for so normally holding it. This ram is connected with valve-chest 86, Figs. 10, 11, and 12, through which passes the pipe 87, leading the air to the boxes, and the pipe 88, leading air to the paper-tower cover. The pipe 89 carries air under pressure to this valve-chest. There is also an arrangement whereby air can be admitted to the rear end of the ram controlled by an outside lever 90, acting on valve 136. This outside lever is connected by a link 91 and bell-crank lever 92 to an arm 93 (see Fig 4) upon a rock-shaft 94. This rock-shaft carries an arm 95, which by the link 200 is pivoted to an arm 201, pivoted at 202 to the frame of the machine. A hand-lever 96 is pivoted to this arm 201. The arm 201 is also pivoted to the bell-crank stop-arm 203, pivoted at 204, and a spring 205 acts on the portion 209 of the stop-arm. Arm 201 has a projection 206 in the path of movement of lever 96. The upper end of lever 203 moves in guide 207, and the lever 203 has a hook end with the detent 208. When the rock-shaft is operated to open the valve 136 either by the lever 96 or by the spacing floating levers, as hereinafter described, the arm 201 is moved, moving the stop-arm 203 so that the detent 208 engages the wall of the guide 207, and the valve 136 is locked in this position until the operator either by hand lifts the detent of arm 203 away from the wall of the guide or by moving the lever 96 upward and releasing it and allowing it to fall, accomplishes the same result. Under these conditions the spring 205 will operate to move the valve 136. Thus the reverse operation of the valve only takes place when the operator desires. Two arms 97 upon the rock-shaft project behind the plunger-rods 98, operated by air-plungers 99, which plungers are normally held in one direction by air-pressure admitted behind them through the pipe 100. These plungers are moved in the opposite direction against this air by the floating levers. If more than one spacing-pin 40 should be thrown in the path of either pair of floating levers at one time, the floating levers will not then contact on opposite sides of one pin, and the fulcra of the levers 38 will then be moved laterally and being directly connected to the plungers 99 will move them against the air-pressure, and the rods will operate the arms 97.

There is a stop 101, Fig. 10, in the path of the forward movement of the ram 84 and a stop 102 in the path of return movement of the ram. These stops are operated as follows: Upon the cam-shaft 18 is the roller 103, carrying two cam-lugs 104 and 105. One lug 104 operates a lever 106, which is connected with the stop 101, moving it out of action, and a spring 107 returns it to action, and a lug 105 operates a lever 108, which is connected to and moves stop 102 out of action, the spring 109 returning it into action. These actions take place at each revolution of the shaft; but the plunger 84 moves only where air is admitted behind it. The lugs are so arranged that stop 101 is retracted when the punch-bar is moving up and out of the plate and just before the space-pawl acts, and the stop 102 is released at the point where the paper-tower feeding is complete. Under normal conditions these cams operate to throw the pins out of action at the proper time; but there being no air behind the plunger it does not act. If for any reason the operator desires to stop the machine, he operates his lever 96, which not only admits air behind this plunger, but by means of link 110 operates a valve 111, which shuts off air-pressure from air-passage 87 to the pilot-boxes and connects same with atmosphere, and this shuts off pressure-air to the paper-tower pipe 88 and opens same to atmosphere. The exhaust-valve 114 has a spring 135, which tends to close the valve. The spring 115 of the lever 90, however, when the lever is unacted on holds this valve open against the action of its spring. When the lever 90 is operated as desired, the spring 135 closes the valve 114, and the air-pressure behind the ram holds it closed. When the lever 09 is returned by the spring 115, the inlet-valve 136 is first closed and then the exhaust-valve 114 opened, as shown in Fig. 10. This operation will also be done automatically when for any cause the two floating levers 28 and 38 do not contact upon the same pin 40 or for any reason there should be a retarding of the movement of the floating levers. When this occurs, the pneumatic plungers 99 will operate. When the plunger 84 thus moves forward, it strikes lever 83, lifting the wiper-cam lever and the paper-tower lever free from their cams. When pin 101 is lifted by the cam 104, and there is air behind the plunger and the plunger moves forward, lever 108 operates so as to throw the stop 102 into action, and thus lock the return of the plunger 84. The first stop 101 is automatically thrown out of action only at the proper time to stop the machine, and the other stop 102 is thrown out of action only at the proper time to allow the machine to operate, the cams being adjusted to the movement of the machine to accomplish this. When operating to punch channels or angle-bars 116, Fig. 13, I use the following adjuncts to the machine: Mounted between the punches $n$ is the spacing member 117, which is secured to the punch-bar $j$, and in the descent of the punch-bar it enters between the bars to be punched, forcing them apart a fixed distance. The bars 116 are held between plungers 118, which plungers are operated pneumatically by arms 119, which are connected with levers 120, contacting with pistons 121 of the pneumatic cylinders 122 and 123. These cylinders are connected together by a pipe 124. The cylinder 122 is connected by a pipe 125 with an air-pressure supply. 126 is a valve controlling the admission of air to cylinders. The operating-lever 127 of this valve is connected to a rod 128, extending loosely through a bracket in a bearing 129 on the punch-bar. A spring 130 surrounds this rod between the bracket and a nut on the rod. This spring normally allows the valve 126 to be held closed by the air-pressure behind it. When the punch-bar descends, it releases the tension of this spring, allowing the spring 131 to operate the valve-lever 127 to open the valve. Air is then admitted to both cylinders through passage 132 and pipe 124, and as the spacing member 117 enters between the bars the plungers 118 hold them firmly against said spacing member during the punching operation.

In order to lift the stock free from the dies 148 after punching, so that the stock may be carried forward by the stock-carrier with certainty, I provide the following mechanism: All of the rollers $b$, which carry the stock, with the exception of those closest to the point of punching, are fixedly mounted. Those rollers, however, which are closest to the point of punching are mounted upon vertically-movable supports 139, having an operative face 140, which is operated upon by a cam 141. This cam is revolved in the following manner: It is mounted upon the shaft 142, to which shaft is connected the crank 143. A rod 144 connects this crank and the lever 145. This lever 145 is provided with a roller 146, which contacts with the cam 147, mounted on the cam-shaft 18. This cam 147 is so constructed and adjusted as to operate the lever 145 to move the cam 141 to lift the movable support 139 just before the spacing-pawl operates.

In order to hold the stock firmly upon the dies 148 during the operation of punching, the following mechanism is used: 149 represents a series of plates. Each plate is adjustably connected to a bar 150, which extends across the machine. This bar 150 is pivotally mounted at 151 and is controlled by the counterweight 152, which is connected to said bar and tends to operate the bar to hold the plates free from the stock. Projecting from the bar 150 is the inclined block 153, having a beveled edge. Connected to the punch-bar j is the projecting surface 154, which in the downward movement of the punch-bar strikes the projecting block 153, operating the bar 150 against the counterweight, forcing the plates 149 into contact with the stock. In the upward movement of the punch-bar when the block 154 passes beyond the surface 153 the counterweight operates to move the plates 149 free from the stock.

In order to stop the movement of the stock-carrier in the spacing movement with certainty where the movement is considerable, and thereby its momentum acquired might otherwise be sufficient to carry it beyond the point to which it is positively driven, I employ the following mechanism: On opposite sides of the rack-bars of the stock-carrier c are the shoes 155. These shoes are each connected to brake-levers, respectively, 156, 157, 158, and 159. Each of the brake-levers is held from longitudinal movement or in fixed position by means of a link 174, pivoted at one end to the rods 160, connecting the levers, the other end pivotally secured to the frame. A rod 160 extends between and through orifices in the brake-levers 156 and 157, having nuts at the rod ends. A spring 161 surrounds these rods 160. The brake-levers 158 and 159 are correspondingly connected. The brake-lever 159 is pivotally attached to the frame of the machine at 162. The lower end of the lever 158 is connected by a rod 163 with the lower end of the brake-lever 157, while the lower end of the brake-lever 156 is connected to a rod 164. Loose on the rod 164 is a collar 165, against which rests a coil-spring 166, surrounding the rod 164, and which rod has at its outer end and at the other end of the spring 166 a nut 167. The collar 165 is pivoted in the bifurcated end of the arm 168. This arm 168 is attached to the vertical shaft 169, the upper end of which carries a bevel-gear 170 of a pair of miter-gears. The other bevel-gear 171 of the pair of miter-gears is connected and operated by the arm 172. The outer end of this arm has a pin which rests in the slotted end of the arm 173, which arm 173 is pivoted to the pawl-block 35. The slot in the end of the arm 173 is of length sufficient to allow a movement of the block, and hence a throw of the pawl of the desired extent, without operating the miter-gears, and thus without operating the brake mechanism. In practice it has been found that within certain limits the momentum of the movement of the stock-carrier is not great enough to necessitate the operation of the brake; but where the extent of movement goes beyond this limit then it is likely to carry the stock-carrier beyond the desired point. Therefore in practice the length of this slot is made sufficient to allow a movement of the pawl-block under action of its rocking frame equivalent to, say, three inches, more or less, of movement of the stock-carrier without affecting the movement of the miter-gear. When, however, the pawl-block is set, either in one operation or in a succession of operations, so that the throw of the block and its pawl is in excess of that required to move the stock-carrier, say, three inches, the excess will produce a corresponding movement of the miter-gears and a corresponding movement of the collar 165, compressing the spring against the nut 167, pulling forward through the action of this spring the rod 164, which moves the lever 156 until its operative shoe contacts with the stock-carrier c, when through the rod 160 the brake-lever 156 will be moved to bring its shoe in contact, and thus through the link 163 and corresponding movements upon the brake-levers 158 and 159 the whole set of brake-shoes will by spring-pressure be brought into action, the train of levers being rendered effective by the fixed fulcrum of the brake-lever 159. By this construction I not only put the brake-shoes into operation with a prearranged extent of movement of the stock-carrier, but I put them into operation gradually and with a pressure dependent upon the excess of the movement from that desired. Thus the greater the movement the greater the pressure.

Having now fully described my invention, what I claim, and desire to protect by Letters Patent, is—

1. In a multiple-punch machine, in combination, a plurality of punches and corresponding gag-blocks movable in and out of alinement with the punches, a pneumatic device for operating the gag-blocks, an independent air-duct for each gag-block-operative device, and independent means for each gag-block-operative device to connect it with a source of air, under pressure, or with an exhaust.

2. In a multiple-punch machine, in combination, a plurality of punches and corresponding gag-blocks movable in and out of alinement with the punches, a pneumatic device for operating the gag-blocks, an independent air-duct for each gag-block-operating device, independent means to connect each gag-block-operative device with a source of air, under pressure, or with an exhaust, and mechanism to control the desired one of said pressure and exhaust connecting means.

3. In a multiple-punch machine, in combination, a plurality of punches and corresponding gag-blocks movable in and out of alinement with the punches, a pneumatic device for operating the gag-blocks, an independent air-duct for each gag-block-operative device, independent means to connect each gag-block-operative device with a source of air, under pressure, or with an exhaust and automatic mechanism to control the desired one of said pressure and exhaust connecting means.

4. In a multiple-punch machine, in combination, a plurality of punches and corresponding gag-blocks movable in and out of alinement with the punches, a pneumatic device for operating the gag-blocks, an independent air-duct for each gag-block-operating device, independent means to connect each gag-block-operative device with a source of air, under pressure, or with an exhaust and pneumatically-operated mechanism to control the desired one of said pressure and exhaust connecting means.

5. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively.

6. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, and means, independent of said valves, to cut off pressure to all the air-ducts.

7. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, and means, independent of said valves, to cut off pressure to all the air-ducts and connect all of said ducts to the exhaust.

8. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, mechanism acting, in one direction to cause connection of the duct with the air-pressure and, in the other direction, to cause connection of said duct with the exhaust.

9. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, mechanism acting, in one direction to cause connection of the duct with the pressure and, in the other direction, to cause connection of said duct with the exhaust, and means to operate said mechanism automatically.

10. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, mechanism acting, in one direction, to cause connection of the duct with the air-pressure, and in the other direction, to cause connection of said duct with the exhaust, and means to operate said mechanism automatically by air-pressure.

11. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, mechanism acting, in one direction, to cause connection of the duct with the air-pressure and, in the other direction, to cause connection of said duct with the exhaust, and means to operate any desired one or more of said mechanism automatically.

12. In a multiple-punch machine, in combination, a plurality of punches and corresponding gag-blocks movable in and out of alinement with the punches, a pneumatic device for operating the gag-blocks, an independent air-duct for each gag-block-operative device, oppositely-working valves for each duct for controlling the connection of the duct with the air-pressure supply and exhaust respectively, mechanism acting, in one direction, to cause connection of the duct with the air-pressure and, in the other direction, to cause connection of said duct with the exhaust, and means to operate any desired one or more of said mechanism automatically by air-pressure.

13. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet, and the other with the exhaust.

14. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet and the other with the exhaust, and a pilot-valve for each set of said valves controlling their operation.

15. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet, and the other with the exhaust, and a pilot-valve for each set of said valves controlling their operation, and air connections for operating said pilot-valves.

16. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet, and the other with the exhaust, a pilot-valve for each set of said valves controlling their operation, and means to operate any desired one or more of said valves.

17. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet and the other with the exhaust, a pilot-valve for each set of said valves controlling their operation, and means to operate any desired one or more of said valves by air-pressure.

18. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto from the air-pressure supply, and an exhaust therefrom, independent passages in said box corresponding to and connected with said duct, oppositely-operating valves for each passage, one controlling the connection with the air-inlet and the other with the exhaust, a pilot-valve for each set of said valves controlling their operation, and air connections independent of the air connection to the box, for operating said pilot-valves.

19. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet, and the other with the exhaust, a pilot-valve for each set of said valves controlling their operation, and air connections independent of the air connection to the box, for operating said pilot-valves, and means to connect any desired one or more of said pilot-valve air connections with the source of pressure supply or exhaust.

20. In a multiple-punch machine, in combination, a plurality of punches and corresponding gag-blocks movable in and out of alinement with the punches, a pneumatic device for operating the gag-blocks, an independent air-duct for each gag-block-operating device, an air-box having an inlet thereto, from the air-pressure supply, and an exhaust therefrom, independent passages in said box corresponding to and connected with said duct, oppositely-operating valves for each passage, one controlling the connection with the air-inlet and the other with the exhaust, an independent air-pipe for each pilot-valve, a cylinder having orifices corresponding to said pilot-valve air-pipes, each pipe extending to its corresponding orifice, a paper passing over said cylinder, means to give said paper a step-by-step movement over said cylinder, the paper overlying the orificed portion of said cylinder in each movement, having perforations corresponding to the desired pilot-valve air pipe or pipes, orifice in the cylinder to be operated, and means to admit air under pressure to the upper surface of said paper at the orificed portion of said cylinder.

21. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto, from the air-pressure supply, and an exhaust therefrom, independent passages in said box corresponding to and connected with said duct, oppositely-operating valves for each passage, one controlling the connection with the air-inlet, and the other with the exhaust, an independent air-pipe from each pilot-valve, a cylinder having orifices corresponding to said pilot-valve air-pipes, each pipe extending to its corresponding orifice, a paper passing over said cylinder, means to give said paper a step-by-step movement over said cylinder, the paper overlying the orificed portion of said cylinder in each movement, having perforations corresponding to the desired pilot-valve air pipe or pipes, orifice in the cylinder to be operated, and means to admit air under pressure to the upper surface of said paper at the orificed portion of said cylinder when said paper is at rest.

22. In a multiple-punch machine, in combination, a plurality of punches and corresponding gag-blocks movable in and out of alinement with the punches, a pneumatic device for operating the gag-blocks, an independent air-duct for each gag-block-operative device, an air-box having an inlet thereto from the air-pressure supply, and an exhaust therefrom, independent passages in said box corresponding to and connected with said duct, oppositely-operating valves for each passage, one controlling the connection with the air inlet, and the other with the exhaust, an independent air-pipe from each pilot-valve, a cylinder having orifices corresponding to said pilot-valve air-pipes, each pipe extending to its corresponding orifice, a paper passing over said cylinder, means to give said paper a step-by-step movement over said cylinder, the paper overlying the orificed portion of said cylinder in each movement, having perforations corresponding to the desired pilot-valve air pipe or pipes, orifice in the cylinder to be operated, and means to admit air under pressure to the upper surface of said paper at the orificed portion of said cylinder when said paper is at rest, and disconnect said air connection when the paper is moving.

23. In a multiple-punch machine, in combination, a plurality of punches and corresponding gag-blocks movable in and out of alinement with the punches, a pneumatic device for operating the gag-blocks, an independent air-duct for each gag-block-operating device, an air-box having an inlet thereto, from the air-pressure supply, and an exhaust therefrom, independent passages in said box corresponding to and connected with said duct, oppositely-operating valves for each passage, one controlling the connection with the air inlet, and the other with the exhaust, an independent air pipe from each pilot-valve, a cylinder having orifices corresponding to said pilot-valve air-pipes, each pipe extending to its corresponding orifice, a paper passing over said cylinder, means to give said paper a step-by-step movement over said cylinder, the paper overlying the orificed portion of said cylinder in each movement, having perforations corresponding to the desired pilot-valve air pipe or pipes, orifice in the cylinder to be operated, a cover comprising an air-box, an inlet adapted to admit air under pressure to said box, said box having an orifice through, corresponding to, and adapted to overlie the paper and in line with the orifices in the cylinder, means to swing said cover toward and from said cylinder, and means in its movement toward the cylinder to admit air to box, and in its other movement to cut off said air-supply.

24. In a multiple-punch machine, in combination with the punches and punch-bar, a lever connected to said punch-bar, an equalizing-bar centrally pivoted to which said lever is connected, and rotary cams operating upon each end of said equalizing-bar.

25. In a multiple-punch machine, in combination with the punches and punch-bar, a lever connected to said punch-bar, an equalizing-bar centrally pivoted to which said lever is connected, there being a cylindrical socket at each end of said bar, cylindrical bearings loosely in said sockets, and a rotary cam operating upon each bearing.

26. In a punch-machine, in combination with the punch-bar, of two horizontally-movable plungers between which the angles or channels in pairs are adapted to be placed, and a vertically-movable spacing member carried by the punch-bar passing between said plungers whereby the channels are held by the plungers against the spacing member.

27. In a punch-machine, in combination with the punch-bar, of two horizontally-movable plungers between which the angles or channels in pairs are adapted to be placed, and a vertically-movable spacing member carried by the punch-bar passing between said plungers, a source of pressure-supply, and means to apply pressure simultaneously to both plungers.

28. In a punch-machine, in combination with the punch-bar, of two horizontally-movable plungers between which the angles or channels in pairs are adapted to be placed, and a vertically-movable spacing member carried by the punch-bar passing between said plungers, and means, during the downward movement of the punch-bar to apply pressure simultaneously with both plungers, and in the upward movement of the punch-bar to simultaneously release said pressure.

29. In combination with the levers of the spacing mechanism, the spacing-pawl, air-box and paper-tower and its operating mechanism, of a plunger, an air-pressure adapted to move said plunger in one direction, said plunger being connected to the levers and adapted to be movable thereby in the opposite direction, mechanism adapted to render the pawl inoperative and to cut off air to the paper-tower and air-box and render the paper-tower mechanism inoperative, and connection between said plunger, and mechanism whereby when said plunger is moved by the spacing-levers said mechanism is thrown into action.

30. In combination with the levers of the spacing mechanism and the operative pawl, of a plunger, an air-pressure adapted to move said plunger in one direction, said plunger being connected to said lever and movable thereby in the opposite direction, mechanism to render the pawl inoperative, and connection between said plunger and said mechanism whereby when the plunger is moved by the spacing-levers said mechanism is thrown into action.

31. In combination with the levers of the spacing mechanism and the operative pawl, of a plunger, an air-pressure adapted to move said plunger in one direction, said plunger being connected to said lever and movable thereby in the opposite direction, mechanism to render the pawl inoperative, and connection between said plunger and said mechanism whereby when the plunger is moved by the spacing-levers said mechanism is thrown into action, and means independent of said plunger to render said pawl effective.

32. In combination with the levers of the spacing mechanism, the air-box and its air connection, a valve controlling said air connection, of a plunger, an air-pressure adapted to move said plunger in one direction, said plunger being connected to said lever and movable thereby in the opposite direction, and connection between said plunger and said valve whereby when the plunger is moved by the spacing-levers said valve is operated to cut off air to the box.

33. In combination with the levers of the spacing mechanism, the air-box and its air connection, a valve controlling said air connection, of a plunger, an air-pressure adapted to move said plunger in one direction, said plunger being connected to said lever and movable thereby in the opposite direction, and connection between said plunger and said valve whereby when the plunger is moved by the spacing-levers said valve is operated to cut off air to the box and exhaust the air-box.

34. In combination with the levers of the spacing mechanism, the air-box and its air connection, a valve controlling said air connection, of a plunger, an air-pressure adapted to move said plunger in one direction, said plunger being connected to said lever and movable thereby in the opposite direction, connection between said plunger and said valve, whereby, when the plunger is moved by the spacing-levers, said valve is operated to cut off pressure to the air-box, and means independent of said plunger to operate the valve to its initial position.

35. In combination with the paper-tower and its operative mechanism and the levers of the spacing mechanism, of a plunger and air-pressure adapted to move said plunger in one direction, said plunger being connected to the levers and adapted to be movable thereby in the opposite direction, means to render the paper-tower mechanism inoperative, connection between said plunger and said means, whereby, when said plunger is moved by the spacing mechanism said means is thrown into action.

36. In combination with the paper-tower and its operative mechanism, and the levers of the spacing mechanism, of a plunger and air-pressure adapted to move said plunger in one direction, said plunger being connected to the levers and adapted to be movable thereby in the opposite direction, means to render the paper-tower mechanism inoperative, connection between said plunger and said means whereby when said plunger is moved by the spacing mechanism said means is thrown into action, and means independent of said plunger to return said paper-tower mechanism.

37. In combination with the levers of the spacing mechanism, the paper-tower and its air connection, and a valve controlling said air connection, of a plunger, an air-pressure adapted to move said plunger in one direction, connection between said plunger and the spacing-levers whereby the plunger is movable in the other direction by the levers, and connection between said plunger and the valve whereby, when the plunger is moved by the levers, the valve is moved to cut off air to the paper-tower.

38. In combination with the levers of the spacing mechanism, paper-tower and its air connection, and a valve controlling said air connection, of a plunger, an air-pressure adapted to move said plunger in one direction, connection between said plunger and the spacing-levers whereby the plunger is movable in the other direction by the levers and connection between said plunger and the valve, whereby when the plunger is moved by the levers the valve is operated to cut off air to the paper-tower, and means, independent of the plunger, to return said valve.

39. In combination with the levers of the spacing mechanism and the spacing-pawl, the air-box and paper-tower and its air connection with a valve for each connection, and the paper-tower-operating mechanism, of mechanism to operate said valve to cut off air to the paper-tower and air-box, and to render said pawl and the paper-tower-operating mechanism inoperative, connection between said levers and said mechanism whereby, in the movement of said levers from their normal movement in one direction, said mechanism is operated.

40. In combination with the levers of the spacing mechanism and the spacing-pawl, the air-box and paper-tower and its air connection with the valve for each connection, and the paper-tower-operating mechanism, of mechanism to operate said valves to cut off air to the paper-tower and air-box, and to render said pawl and the paper-tower-operating mechanism inoperative, connection between said levers and said mechanism whereby in the movement of said levers from their normal movement in one direction said mechanism is operated, and means, independent of said levers to operate said mechanism oppositely.

41. In combination with the levers of the spacing mechanism and the spacing-pawl, of mechanism adapted to render said pawl inoperative, and connection between said levers and said mechanism whereby, in the movement of said levers, beyond the normal movement, said mechanism is operated.

42. In combination with the levers of the spacing mechanism and the spacing-pawl, of mechanism adapted to render said pawl inoperative, and connection between said levers and said mechanism whereby, in the movement of said levers, beyond the normal movement, said mechanism is operated, and means, independent of said levers, to return said pawl to operative position.

43. In combination with the levers of the spacing mechanism, the air-box and its air connection, and a valve controlling said connection, and connection between said levers and said valve whereby, in the movement of the levers beyond the normal movement, said valve is operated to cut off air from air-box.

44. In combination with the levers of the spacing mechanism, the air-box and its air connection, and a valve controlling said connection, and connection between said levers and said valve whereby, in the movement of the levers beyond the normal movement, said valve is operated to cut off air from the air-box, and means independent of said levers to return said valve to its initial condition.

45. In combination with the levers of the spacing mechanism, and the paper-tower and air connection thereto, and a valve controlling said connection, of connection between said levers and said valve whereby, in the movement of the levers beyond the normal movement, said valve is operated to cut off air from the paper-tower.

46. In combination with the levers, of the spacing mechanism, and the paper-tower and air connection thereto, and a valve controlling said connection, of connection between said levers and said valve whereby, in the movement of the levers beyond the normal movement, said valve is operated to cut off air from the paper-tower, and means, independent of said levers, to return said valve to its initial condition.

47. In combination with the levers, of the spacing mechanism, the paper-tower and its operating mechanism, of controlling mechanism adapted to render said paper-tower mechanism inoperative, connection between said paper-tower-controlling mechanism, and said levers whereby in the movement of the levers beyond the normal movement, said last-mentioned mechanism is rendered effective.

48. In combination with the levers, of the spacing mechanism, the paper-tower and its operating mechanism, of controlling mechanism adapted to render said paper-tower mechanism inoperative, connection between said paper-tower-controlling mechanism and said levers, whereby, in the movement of the levers beyond the normal movement of the levers in one direction from the normal movement, said last-mentioned mechanism is rendered effective, and means independent of said levers to return said paper-tower mechanism to operate.

49. In combination with the spacing-pawl, and a device adapted to render said pawl inoperative, of a plunger, means to move said plunger in one direction, a valve adapted to admit air to move the plunger in the opposite direction, and exhaust air therefrom, connection with the pawl device in line of movement of said plunger in the last-mentioned direction, whereby when the plunger moves in said direction, said device is moved into action, and said pawl rendered inoperative.

50. In combination with the spacing-pawl, and a device adapted to render said pawl inoperative, of a plunger, means to move said plunger in one direction, a valve adapted to admit air to move the plunger in the opposite direction, and exhaust air therefrom, connections with the pawl device in line of movement of said plunger in the last-mentioned direction, whereby when the plunger moves in said direction said device is moved into action, and said pawl rendered inoperative, stops movable in line with said plunger on opposite sides respectively at the end of the stroke in each direction.

51. In combination with the spacing-pawl, and a device adapted to render said pawl inoperative, of a plunger, means to move said plunger in one direction, a valve adapted to admit air, to move the plunger in the opposite direction and exhaust air therefrom, connections with the pawl device in line of movement of said plunger in the last-mentioned direction, whereby when the plunger moves in said direction, said device is moved into action and said pawl rendered inoperative, stops movable in line with said plunger on opposite sides respectively at the end of the stroke in each direction, a main driving-shaft, and connection between said stops and shaft, whereby said stops are automatically thrown in and out of operation during each rotation of the shaft.

52. In combination with the spacing-pawl, and a device adapted to render said pawl inoperative, of a plunger, means to move said plunger in one direction, a valve adapted to admit air to move the plunger in the opposite direction, and exhaust air therefrom, connections with the pawl device in line of movement of said plunger in the last-mentioned direction, whereby when the plunger moves in said direction said device is moved into action, and said pawl rendered inoperative, the floating levers of the spacing mechanism and connection between said floating levers, and the valve whereby, when the floating levers move beyond their normal movement, said valve is operated to admit air.

53. In combination with the paper-tower and its air-pressure connection, and a valve adapted to connect said box with the air pressure and exhaust, of a plunger adapted in its movement in one direction to operate the valve to connect the paper-tower with the exhaust, and in the other direction with the air-pressure, means to move said valve in the first-mentioned direction, a valve adapted to admit air-pressure to move the plunger in the other direction, and exhaust air therefrom.

54. In combination with the paper-tower and its air-pressure connection, and a valve adapted to connect said box with the air pressure and exhaust, of a plunger adapted in its movement in one direction to operate the valve to connect the paper-tower with the exhaust, and in the other direction with the air-pressure, means to move said valve in the first-mentioned direction, a valve adapted to admit air-pressure to move the plunger in the other direction and exhaust air therefrom, stops movable in line with said plunger on opposite sides respectively at the end of the stroke in each direction.

55. In combination with the paper-tower and its air-pressure connection, and a valve adapted to connect said box with the air pressure and exhaust, of a plunger adapted in its movement in one direction to operate the valve to connect the paper-tower with the exhaust, and in the other direction with the air-pressure, means to move said valve in the first-mentioned direction, a valve adapted to admit air-pressure to move the plunger in the other direction and exhaust air therefrom, stops movable in line with said plunger on opposite sides, respectively at the end of the stroke in each direction, a main driving-shaft, and connections between said stops and shaft, whereby said stops are automatically thrown in and out of operation during each rotation of the shaft.

56. In combination with the paper-tower and its air-pressure connection, and a valve adapted to connect said box with the air pressure and exhaust, of a plunger adapted in its movement in one direction to operate the valve to connect the paper-tower with the exhaust, and in the other direction with the air-pressure, means to move said valve in the first-mentioned direction, a valve adapted to admit air-pressure to move the plunger in the other direction and exhaust air therefrom, the floating levers of the spacing mechanism and connection between said floating levers, and the valve whereby when the floating levers move beyond their normal movement, said valve is operated to admit air and in the return movement to exhaust air.

57. In combination with the plunger for controlling by its movement the operative and inoperative position of the spacing-pawl, the admission and exhaust of air to and from the paper-tower, and the valve for controlling the admission of air-pressure to drive the plunger in one direction, of the air-box, its air-pressure connection and valve for controlling the connection of air-box with the air pressure and exhaust, of connections between the air-box-controlling valve, and the plunger-valve, whereby when the plunger-valve is operated to connect the plunger with air-pressure the air-box valve is operated to connect the air-box with the exhaust.

58. In a machine of the character described, in combination, a plunger, means operating upon said plunger to move it in one direction, a valve adapted to admit air to drive said plunger in the opposite direction, and to relieve said pressure, stops adapted to lock the movement of the plunger in each direction, and means to move said stops in and out of operative position.

59. In a machine of the character described, in combination, a plunger, means operating upon said plunger to move it in one direction, a valve adapted to admit air to drive said plunger in the opposite direction and to relieve said pressure, stops adapted to lock the movement of the plunger in each direction, and means, during the operation of the machine, to move said stops in and out of operative position.

60. In a machine of the character described, in combination, a plunger, means operating upon said plunger to move it in one direction, a valve adapted to admit air to drive said plunger in the opposite direction and to relieve said pressure, stops adapted to lock the movement of the plunger in each direction, and means to move said stops in and out of operative position, a main driving-shaft and connection between said stops and shaft, whereby said stops are automatically thrown in and out of operation during each rotation of the shaft.

61. In a machine of the character described, in combination with the punch-bar and its punches and the stock-carrier, of a stock-carrier roller, a vertically-movable support upon which said stock-carrier roller is mounted, and means to positively elevate said supports.

62. In a machine of the character described, in combination with the punch-bar and its punches and the stock-carrier, of a stock-carrier roller, a vertically-movable support upon which said stock-carrier roller is mounted, and means, adapted at predetermined times, to elevate said support.

63. In a machine of the character described, in combination with the punch-bar and its punches, and the stock-carrier, of a stock-carrier roller, a vertically-movable support upon which said stock-carrier roller is mounted, and means, adapted at predetermined times, to elevate and depress said support.

64. In a machine of the character described, in combination with the punch-bar and its punches, and the stock-carrier, of a stock-carrier roller, a vertically-movable support upon which said stock-carrier roller is mounted, support-elevating mechanism, a main driving-shaft, and connection between said support-elevating mechanism and main driving-shaft, whereby said support-elevating mechanism is operated during the rotation of the main driving-shaft.

65. In a machine of the character described, in combination with the punch-bar and its punches, and the stock-carrier, of a stock-carrier roller, a vertically-movable support upon which said stock-carrier roller is mounted, support-elevating mechanism, driving mechanism, and connection between said support-elevating mechanism and driving mechanism, whereby said support-elevating mechanism is operated during the operation of the driving mechanism.

66. In a machine of the character described, in combination with the punch-bar and its punches, and the stock-carrier, of a stock-carrier roller, a vertically-movable support upon which said stock-carrier roller is mounted, a cam for operating said support, a main driving-shaft, and connection between said cam and main driving-shaft whereby said cam is operated during the rotation of the main driving-shaft.

67. In a machine of the character described, for the purpose of holding the stock during punching, in combination with the vertically-movable punch-bar, of a plurality of plates spaced across the machine, a pivotally-mounted bar adjustable securing means connecting said plates and bar, and coöperating means adapted in the descent of the punch-bar to operate said plate-bar and move the plates downward.

68. In a machine of the character described for the purpose of holding the stock during punching, in combination, a plate, a support to which said plate is adjustably secured, and means to move said plate against the stock.

69. In a machine of the character described for the purpose of holding the stock during punching, in combination with the punch-bar, of a plate, a support to which said plate is adjustably secured, and means during the descent of the punch-bar to move said plate against the stock.

70. In a machine of the character described, for the purpose of holding the stock during punching, in combination with the vertically-movable punch-bar, of a plurality of plates spaced across the machine, a pivotally-mounted bar adjustable securing means connecting said plates and bar, and coöperating means adapted, in the descent of the punch-bar, to operate said plate-bar, and means to lift the plate-bar when freed from the coöperating means.

71. In a machine of the character described for the purpose of holding the stock during punching, in combination, with the vertically-movable punch-bar, of a vertically-movable plate adjustably-supported coöperating device carried by the plate-support and the punch-bar adapted in the downward movement of the punch-bar to force said plate downward.

72. In a machine of the character described for the purpose of holding the stock during punching, in combination, with the vertically-movable punch-bar, of a vertically-movable plate adjustably-supported coöperating device carried by the plate-support, and the punch-bar adapted in the downward movement of the punch-bar to force said plate downward, and means to lift the plate when the plate-support device is released from the punch-bar coöperating device.

73. In a stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever.

74. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a spring surrounding said rod between said brake-levers, a link connecting two levers, one of each pair, one of the remaining levers being pivoted to the frame of the machine, and an operating-rod connected to the other remaining lever.

75. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between one of each pair, one of the remaining levers being pivoted to the frame of the machine, and an operating-rod connected to the other remaining lever, spacing mechanism for the stock-carrier, and connection between said rod and the spacing mechanism, whereby said movement in the operation of said spacing mechanism said rod is operated.

76. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between one of each pair, one of the remaining levers being pivoted to the frame of the machine, and an operating-rod connected to the other remaining lever, spacing mechanism for the stock-carrier, and loose connection between said rod and the spacing mechanism, whereby said movement in the operation of said spacing mechanism said rod is operated, after a predetermined movement of said spacing mechanism.

77. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, the spacing pawl-block, the rocking frame in which the block is adjustably supported, connection between said block and said brake-lever rod.

78. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, the spacing pawl-block, the rocking frame in which the block is adjustably supported, loose connection between said block and said brake-lever rod.

79. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted, when rendered active, to move said rod.

80. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted, when rendered active, to move said rod, spacing mechanism for the stock-carrier, and connection between said spring and spacing mechanism, whereby in the operation of the spacing mechanism said spring is rendered active and the extent of its action dependent on the extent of operation of the spacing mechanism.

81. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted when rendered active, to move said rod, spacing mechanism for the stock-carrier, and loose connection between said spring and spacing mechanism, whereby in the operation of the spacing mechanism said spring is rendered active and the extent of its action dependent on the extent of operation of the spacing mechanism, after a predetermined movement of the spacing mechanism.

82. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted when rendered active, to move said rod, the spacing pawl-block, the rocking-frame in which the block is adjustably mounted, and connection between said block and said spring pawl-block, whereby in the movement of said block by said spacing-frame, said spring is rendered active and the extent of its action dependent upon the extent of the movement of the block.

83. In the stock-carrier mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted when rendered active, to move said rod, the spacing pawl-block, the rocking frame in which the block is adjustably mounted, and loose connection between said block and said spring pawl-block, whereby, in the movement of said block by said spacing-frame, said spring is rendered active and the extent of its action dependent upon the extent of the movement of the block, after a predetermined movement of the pawl-block.

84. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted when rendered active, to move said rod, a loose and a fixed collar upon said rod, a spring surrounding said rod, between said collars, spacing mechanism for the stock-carrier and connection between said collar and said spacing mechanism.

85. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted, when rendered active, to move said rod, a loose and a fixed collar upon said rod, a spring surrounding said rod, between said collars, spacing mechanism for the stock-carrier and loose connection between said collar and said spacing mechanism.

86. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted, when rendered active, to move said rod, a loose and a fixed collar upon said rod, a spring surrounding said rod, between said collars, the spacing pawl-block, the rocking frame in which it is adjustably mounted, and connection between said block and said loose collar.

87. In the stock-carrier braking mechanism described, in combination, brake-shoes in pairs adapted to grasp opposite sides respectively of each stock-carrier rack-bar, pivoted brake-levers supporting said levers, a rod, having collars thereon, for each pair of levers, extending between and through said levers, a link connecting two levers, one of each pair, one of the remaining levers being pivoted to the frame of the machine, and an operating-rod connected to the other remaining lever, a spring adapted when rendered active, to move said rod, a loose and a fixed collar upon said rod, a spring surrounding said rod, between said collars, the spacing pawl-block, the rocking frame in which it is adjustably mounted, and loose connection between said block and said loose collar.

88. In a multiple-punch machine, a plurality of punches and corresponding gag-blocks movable in and out of alinement with the punches, a pneumatic device for each gag-block, an independent air-duct for each gag-block-operating device, a source of air-pressure supply, and an exhaust, and means to connect the desired air duct or ducts with the pressure-supply, and the remainder with the exhaust.

89. In a multiple-punch machine, a plurality of punches and corresponding gag-blocks movable in and out of alinement with the punches, a pneumatic device for each gag-block, an independent air-duct for each gag-block-operating device, a source of air-pressure supply, and an exhaust, a pneumatic device for controlling the connection of the desired air duct or ducts with the pressure-supply, and the remainder with the exhaust, and a connection for the pressure-supply to said pneumatic device, independent of the connection to the air-ducts.

In testimony of which invention I have hereunto set my hand, at Philadelphia, on this 14th day of May, 1906.

LARS H. VOLD.

Witnesses:
M. M. HAMILTON.
E. E. WALL.